July 25, 1939.  T. RYAN  2,167,490
APPARATUS FOR LOCATING CONCEALED CONDUCTIVE BODIES
Filed May 7, 1937   2 Sheets-Sheet 1
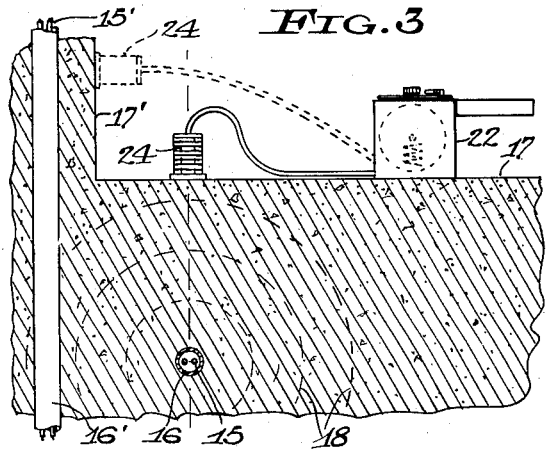
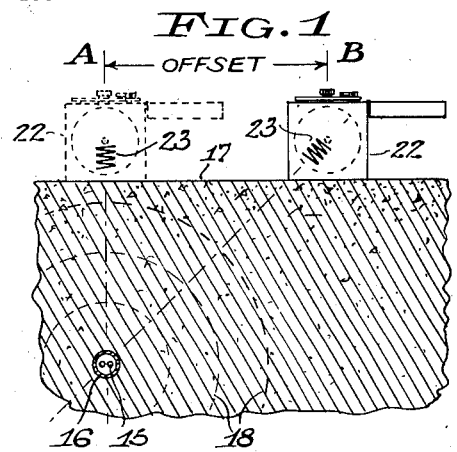
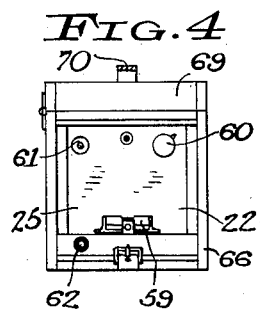
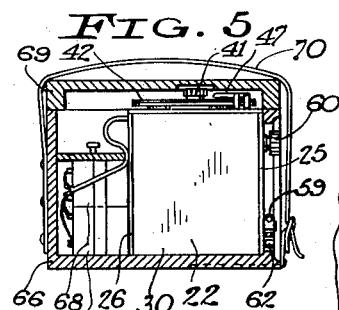
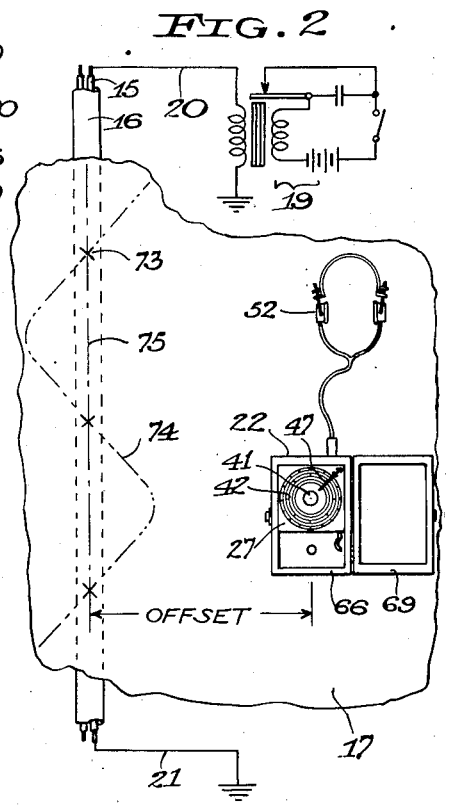
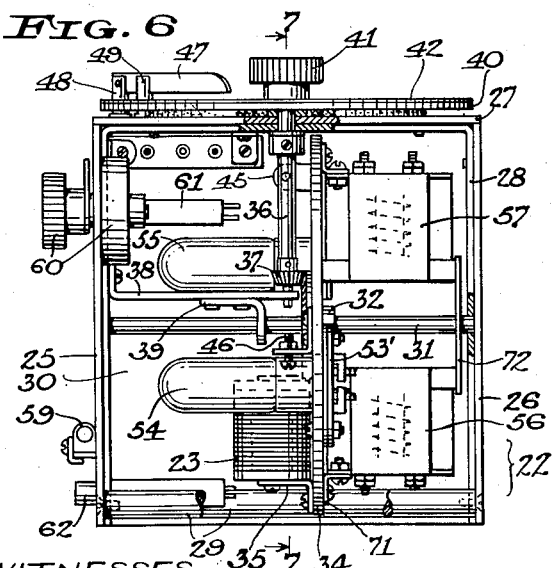
INVENTOR
Thomas Ryan
By R. S. Caldwell
ATTORNEY
WITNESSES
L. E. Kilian
C. L. Waal July 25, 1939.  T. RYAN  2,167,490

APPARATUS FOR LOCATING CONCEALED CONDUCTIVE BODIES

Filed May 7, 1937   2 Sheets-Sheet 2

INVENTOR
Thomas Ryan
By R. S. Caldwell
ATTORNEY

WITNESSES
L. E. Kilian
C. L. Waal

Patented July 25, 1939

2,167,490

UNITED STATES PATENT OFFICE 2,167,490

APPARATUS FOR LOCATING CONCEALED CONDUCTIVE BODIES

Thomas Ryan, Milwaukee, Wis., assignor of two-fifths to Henry B. Burr, Milwaukee, Wis.

Application May 7, 1937, Serial No. 141,218

8 Claims. (Cl. 175—183)

The invention relates to the art of locating concealed electrically conducting bodies, and to apparatus for determining the location of such bodies.

It is sometimes desirable to know the location, route, position, or approximate depth of concealed conducting bodies, such as underground or submarine cables, wires, conduits, and pipes, to facilitate access thereto, to avoid interference therewith in excavating, cutting, or other operations, or to record the location for future reference. Similar information may be desired as to various kinds of conductors embedded or buried in pavements, floors, walls, or ceilings. The concealed conducting bodies may have become lost by failure to keep records, loss or inaccuracy of records, changes of plans, relocation of curbs and property lines, changes in grades, or for other reasons.

An object of the invention is to provide an improved method of detecting and locating such bodies, capable of being carried out with relatively simple apparatus and requiring comparatively little time and effort.

Another object of the invention is to provide improved apparatus for this purpose which can be handled by one person, which is easy to manipulate and is accurate in operation, which is of direct-reading character to avoid the necessity for computation, which does not require expert knowledge to use, and which is of simple and inexpensive construction.

The invention further consists in the several features hereinafter described and claimed.

In the accompanying drawings, illustrating the method and apparatus of the invention, Fig. 1 is a schematic sectional view showing one method of locating an underground conductor by the apparatus, different positions of the apparatus being indicated by full and dotted lines;

Fig. 2 is a schematic plan view of the set-up shown in Fig. 1, the view also showing a generating device for establishing a signal current through the conductor;

Fig. 3 is a view similar to Fig. 1 but showing another method of using the apparatus, suitable for locating conductors which are either underground or in a wall;

Fig. 4 is a front view of an exploring device or instrument, parts being shown in section;

Fig. 5 is a sectional elevation of the exploring instrument, taken through a carrying case thereof;

Fig. 6 is a side elevation of the exploring instrument removed from the case, parts being broken away and parts being shown in section;

Figure 7:
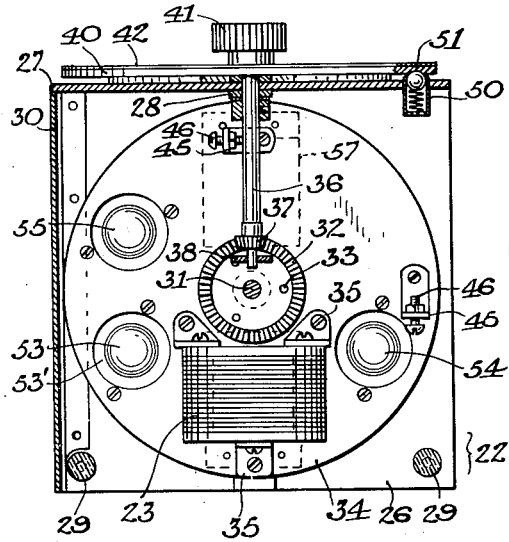
Fig. 7 is a sectional view of the exploring instrument taken generally along the line 7—7 of Fig. 6.
Figure 8:
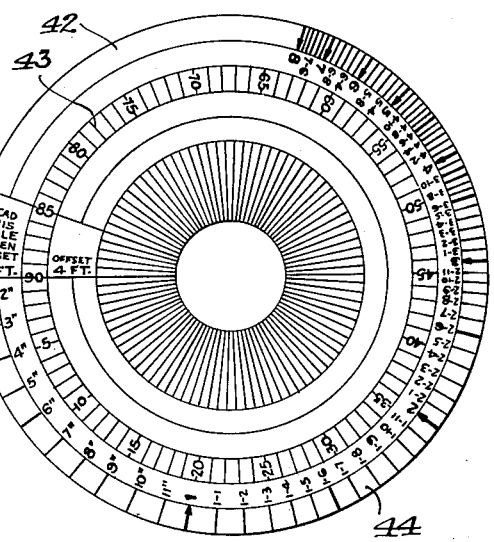
Fig. 8 is a view of a calibrated dial for the exploring instrument.
Figure 9:
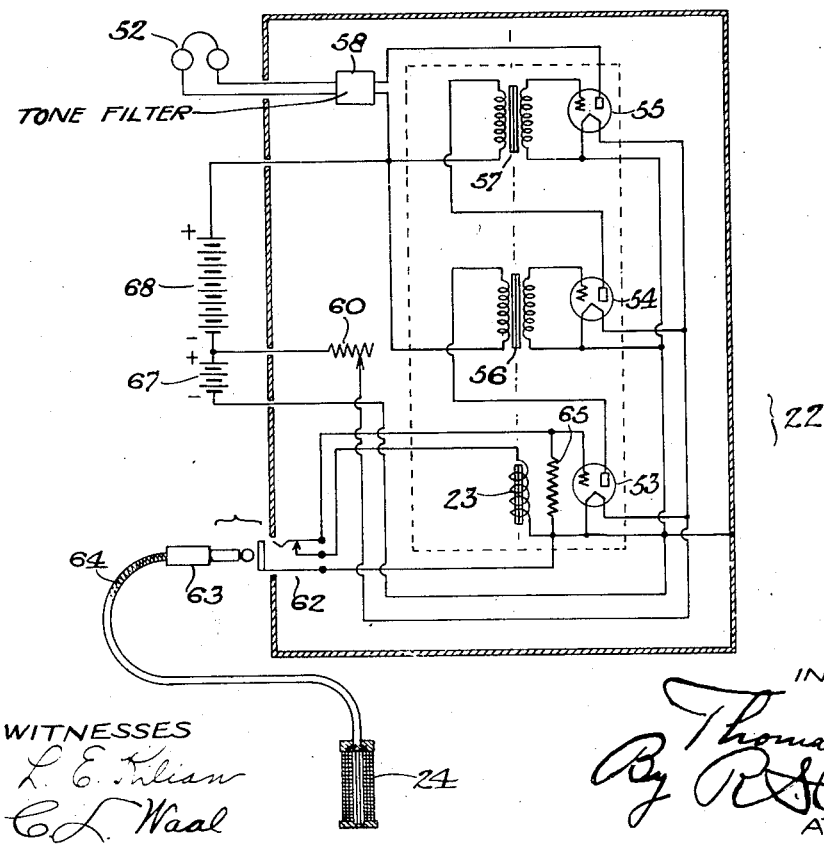
Fig. 9 is a wiring diagram of the exploring instrument.

Referring to the drawings, 15 designates a concealed electrically conducting body which is to be located by the method and apparatus of the invention. By way of example, the body 15 is here shown to be in the form of a conductor or cable enclosed in a conduit 16, Figs. 1, 2, and 3, laid below the horizontal surface 17 of the earth, or of a floor or pavement. In the modified form of installation shown in Fig. 3, another conductor 15' is enclosed in a conduit 16' embedded or extending within a vertical wall 17'.

In carrying out the method of the invention, an alternating electromagnetic field, preferably of audio-frequency, is set up about the conductor to act on searching or exploring apparatus hereinafter described. The electromagnetic field is represented at 18 by circular arcs concentric about the conductor. The electromagnetic field is set up in any desired manner, as by means of a generator 19 of any suitable type, here shown to be a buzzer generator of the kind commonly used in telephone testing. The output terminals of the generator are connected to the conductor 15 (or 15') by leads 20 and 21. This may be done at a manhole, terminal box, switchboard, or other accessible point. The test circuit may have either a metallic or ground return, whichever is desired or convenient, a ground return being shown in the present instance. In the case of a power conductor carrying alternating current, it is sometimes possible to dispense with the use of the generator 19.

A searching or exploring unit or instrument is designated generally by 22, and includes selectively usable exploring coils or inductors 23 and 24, the latter being an auxiliary coil. Each of these coils consists of many turns of wire and is here shown to be of the iron core type with an open magnetic circuit, although it may be of the air core type, if desired. By placing either coil in the alternating electromagnetic field surrounding the conductor, a voltage will be induced in the coil and will be made known to the observer by means of suitable amplifying and indicating means hereinafter described. By suitably translating or rotating the coil, or both, the voltage induced in the coil will vary and reach a minimum or null point, and from the position, or different positions, of the coil, conclusions can be reached as to the position or location of the conductor. If the coil 23 has its axis in a vertical position and is translated laterally above the conductor, the point of minimum induced voltage will occur when the coil is vertically above the conductor as indicated at A in Fig. 1. A similar position for the coil 24 is shown by full lines in Fig. 3. If the coil 23 is translated laterally from position A of Fig. 1, a voltage will again be induced in the coil, but can be reduced to a minimum or null point by rotating the coil to an angular position as indicated at B in Fig. 1. The extent of offset of the coil 23 from the position A and the angular displacement of the coil from the vertical can then be correlated to determine the depth of the conductor from the surface 17 of the ground. As hereinafter described, the exploring unit or instrument is of direct-reading character, so that no computations are necessary. The auxiliary coil 24 is also used for locating the conductor 15' in the wall 17', as indicated by dotted lines in Fig. 3, the coil having a minimum voltage induced therein when the axis of the coil is horizontal and the coil is directly opposite the conductor. Each coil will also have a point of minimum voltage when its axis is parallel to the conductor, but this position is not utilized.

The exploring instrument 22 comprises a frame formed of spaced front and back metal panels 25 and 26, respectively, connected by a metal top panel 27, as by means of an inverted U-shaped metal strap or bracket 28 and insulating bottom rods 29, the strap engaging the inner faces of the panels. The frame also has a metal side panel 30, but the other side and bottom of the frame are open. A horizontal shaft 31 has its ends journalled in the legs of the strap 28 and has secured thereto a bevel gear 32 on which is rigidly mounted by screws 33 a metal disk or plate 34. The exploring coil 23 is mounted on one face of the disk 34 by angle brackets 35, the axis of the coil extending in an axial plane of the disk and at right angles to the shaft 31. The disk is rotated by a vertical shaft 36 having a bevel pinion 37 meshing with the bevel gear 32, the shaft being journalled in the upper part of the strap 28 and in a bracket 38 secured to one leg of the strap, and the bracket 38 having a part 39 in which an intermediate part of the shaft 31 is journalled. The upper end of the vertical shaft 36 projects through the top panel 27 and carries a dial disk 40 and operating knob 41. The disk 40 detachably carries thereon a calibrated dial 42 provided with scales 43 and 44, the former being arranged in degrees. The gear ratio between the bevel gear 32 and pinion 37 is greater than one-to-one, preferably four-to-one, so as to spread out the scale, a 360° rotation of the dial disk 40 corresponding to a 90° rotation of the coil-carrying disk 34. The disk 34 is stopped at the ends of its 90° travel by angle brackets 45 secured to the disk and carrying adjustable stop screws 46 engageable with the vertical shaft 36. The other scale 44 on the calibrated dial directly indicates the depth of the conductor for a predetermined lateral offset between the vertical plane of the shaft 31 and the vertical plane of the concealed conductor. An offset of two feet has been found suitable for indicating conductor depths up to about eight or nine feet, which will cover a wide field of use. For greater conductor depths, the dial may have an additional similar scale, not shown, correlated to an offset of four feet or other convenient distance, and if desired other dials with different scales for greater offsets may be substituted. The dial scales cooperate with an index finger 47 in the form of a blade pivoted on a post 48 secured to the top panel 27, the blade being positioned by its entry into a vertically slotted post 49 secured to the top panel. The index blade 47 is capable of being swung upwardly when it is desired to change dials.

During the use of the device it is desirable to hold the exploring coil 23 temporarily in its vertical position. This may be accomplished in any suitable manner, as by means of a spring detent 50 carried on the top panel 27 and engageable in a shallow pocket 51 formed in the bottom face of the dial disk 40.

The terminals of the exploring coil 23 are connected to a multiple stage vacuum tube amplifier, the output circuit of which includes a suitable indicator or responsive device, here shown to be a telephone head set 52. The amplifier includes vacuum tubes 53, 54 and 55 and coupling devices therefor, here indicated to be iron core transformers 56 and 57. If desired, a suitable tone filter 58 may be incorporated in the amplifier. The front panel 25 carries a level 59, a filament rheostat 60 which also forms a switch, a telephone jack 61, and a jack 62 for a plug 63 on a shielded cable 64 connected to the exploring coil 24. The jack 62 substitutes the external exploring coil 24 for the rotatable exploring coil 23. Oscillations in the amplifying circuit are prevented in any suitable manner, as by a stabilizing resistance 65 connected across the input of the vacuum tube 53. The filament circuit is grounded on the metal shielding panels of the instrument. The vacuum tubes are mounted in sockets 53'.

The instrument is mounted in a suitable carrying case 66 which also holds the filament battery 67 and plate battery 68 for the instrument. The case is here shown to be provided with a hinged cover 69 and carrying strap 70.

In order to insure accurate pick-up and sharp indication, the vacuum tubes and their coupling transformers are also mounted on the rotatable disk 34 which carries the exploring coil 23. The transformers are mounted on the opposite side of the disk from the exploring coil by brackets 71 and have the axes of their windings parallel to that of the exploring coil and arranged diametrically of the shaft 31, the transformers being placed on opposite sides of this shaft. The axes of the exploring coil and transformers thus lie in the same axial plane through the shaft 31. A supporting bar 72 connects the outer portions of the transformers to the shaft 31. The electrical components on the disk 34 are connected by flexible leads to the stationary parts. The transformers 56 and 57, although they preferably have closed cores, may have a pick-up action similar to that of the exploring coil 23, but somewhat weaker. However, because of the relation of the transformers to the exploring coil, and because of proper poling they will not interfere with the proper operation or amplification. The calibrations on the dial are approximately in accord with the results obtained by triangulation, taking into account the height of the shaft 31 above the ground or reference surface. Because of certain variations it is preferred to calibrate the dial from test conductors of known positions. The metal panels of the instrument form a shielding enclosure for the rotatably mounted exploring coil and serve to reduce extraneous noises without interfering with the normal pick-up action of the coil.

In carrying out the method, an alternating electromagnetic field is set up about the conductor to be located by passing an alternating current through the conductor, as by means of the generator 19. In the case of an underground conductor 15, the observer or operator places the exploring unit or instrument on the surface 17 of the ground or pavement in a region above the conductor and listens for the generator tone in the head set, the exploring coil 23 being held in its vertical position by the detent 50. When the instrument is brought into the electromagnetic field, a tone is heard in the head set. This tone will increase in intensity as the instrument is brought closer to the conductor, until the exploring coil is directly above the conductor, at which point the tone becomes nearly or completely inaudible. The observer then places a suitable marker on the ground or pavement, such as a chalk mark 73, Fig. 2, on the point directly above the conductor. This procedure is repeated to locate and mark other points on the ground surface 17 directly above the conductor, the observer moving the instrument in a more or less zig-zag or sinuous path 74, Fig. 2, over the conductor. The row of chalk marks on the ground surface directly above the conductor will then indicate the trace 75 of the conductor, or of the longitudinal or electrical axis of the conductor. For many purposes this indication is sufficient to meet requirements.

In some cases, however, it is also necessary or desirable to determine the depth of the conductor. The observer, after having mapped or traced out on the surface of the ground the trace or course of the underground conductor, laterally offsets the instrument a predetermined distance, say two feet, from the line of chalk marks, the axis of the shaft 31 being parallel to the line and the open bottom and side of the instrument frame being toward the conductor. A tone is again heard in the head set 52, and by turning the dial knob 41 to tilt the coil 23, the tone reaches a point of minimum audibility. The observer then reads directly from the dial 42 the depth of the conductor at the point, and suitably notes the reading, as by chalking the figures on the ground or pavement surface. The observer then repeats the procedure at successive points or stations along and parallel to the course of the conductor, recording the depth of the conductor at the several stations. Since the signal current is confined more or less to one conductor, the proximity of other conductors will not affect the reliability of the results.

Instead of using the exploring coil 23 in the instrument for determining the course or trace of the conductor, the auxiliary exploring coil 24 may be used for this purpose, as indicated in Fig. 3. In this case the dial 42 is set at a predetermined point, for example, the zero point by the detent 50 and is maintained in such position during the observations. In some instances, the dial is rotated to a point of silence or minimum sound and is then maintained at this point. The auxiliary exploring coil 24 is plugged into the instrument, replacing the main exploring coil 23, and is moved in vertical position over the ground or pavement surface and in the zig-zag or sinuous path 74 indicated in Fig. 2. This is generally easier and more convenient than similarly moving the entire instrument. When the auxiliary exploring coil 24 is directly over the conductor, the tone in the head set will be at a point of minimum audibility. In a similar manner, the coil 24 may be used to locate a conductor 15' within a wall 17', a position of the coil 24 being indicated by dotted lines in Fig. 3. The exploring coil 24 is useful in tracing conductors in confined locations, as in floors, walls, and ceilings, where it is not convenient to use the main exploring coil in the instrument.

The tone filter 58, when connected in the circuit, is tuned to the frequency of the generator 19 and is useful in suppressing extraneous noises. The frequency of the generator 19 is preferably several times higher than that used in power and lighting circuits.

If a power or lighting circuit carrying alternating current is to be located while in service, no separate tone generator is required, but the observer must be able to distinguish the tone produced by the current from other tones or hums which may be picked up from other nearby current-carrying conductors. In certain cases, the signal current may be superimposed on the power current or other current normally carried by the conductor, thus avoiding possible confusion in the tones heard in the head set.

In locating a submarine cable, as for the purpose of repairs or replacement, the exploring instrument may be carried in a boat, care being taken to hold the instrument level at the time that observations are made. The cable can be quickly located, even if buried in a muddy bottom, and can be hauled up by the aid of a diver or grappling hooks, or both. For locating a submarine cable it is ordinarily sufficient to determine one or more points in a vertical plane through the cable.

By keeping the signal current through the conductor in the audible range, it is not necessary to provide for demodulation or frequency changing in the exploring instrument.

In some instances, the trace or course of the conductor, but not the depth, may be known from existing records. In this event, of course, the course-finding steps of the method may be omitted, except for checking purposes.

The method and apparatus of the invention may also be used to determine the location of faults, such as short-circuits, grounds, crosses or split pairs, in power, communication, and other conductors. The invention is also applicable to the location of conducting bodies which do not normally carry electric current, such as water, sewer, gas, and oil pipes or mains.

In determining the depth of the conducting body, it is preferred to laterally offset the exploring coil 23 a predetermined distance from the trace of the body and to then rotate the coil to the point of minimum induced voltage, as hereinbefore described, but it would also be possible to set the coil at a predetermined angle and to then vary the lateral offset of the coil until the point of minimum induced voltage is reached.

What I claim as new and desire to secure by Letters Patent is:

1. Apparatus for locating a concealed electrically conducting body, comprising an exploring coil in which a voltage is induced by an alternating magnetic field, a support on which said coil is rotatably mounted, the magnetic axis of said coil being transverse to its rotational axis, and means including a vacuum tube amplifier for indicating the induced voltage, said amplifier including an inductive coupling device rotatable with said exploring coil to prevent false pick-up by said device.

2. Apparatus for locating a concealed electrically conducting body, comprising a pair of selectively effective exploring coils in which a voltage is induced by an alternating magnetic field, one of said coils being rotatably mounted to swing about a horizontal axis, and the other coil being relatively movable with respect to the first coil and having a flexible electrical connection with the apparatus to be freely movable in all directions, and responsive means for indicating the induced voltage and having a selective connection with said coils.

3. Apparatus for locating a concealed electrically conducting body, comprising a normally horizontal rotatably mounted shaft, a plate carried on said shaft, an exploring coil carried on said plate and having its axis transverse to said shaft, amplifying vacuum tubes carried on said plate, and an inductive coupling device for said tubes also carried on said plate, the magnetic axis of said coupling device being fixed with respect to said exploring coil.

4. Apparatus for locating a concealed electrically conducting body, comprising an exploring coil in which a voltage is induced by an alternating magnetic field, a support on which said coil is rotatably mounted, and means including an amplifying vacuum tube for indicating the induced voltage, said tube being rotatable with said exploring coil, and the magnetic axis of said coil being transverse to the rotational axis of said coil.

5. Apparatus for locating a concealed electrically conducting body, comprising a rotatably mounted exploring coil in which a voltage is induced by an alternating mgnetic field, the axis of rotation being transverse to the coil axis, and means including a vacuum tube amplifier for indicating the induced voltage, said amplifier including an inductive coupling device rotatable with said exploring coil, the magnetic axes of said coil and coupling device being substantially parallel.

6. Apparatus for locating a concealed electrically conducting body, comprising a rotatably mounted exploring coil in which a voltage is induced by an alternating magnetic field, the axis of rotation being transverse to the coil axis, and means including a vacuum tube amplifier for indicating the induced voltage, said amplifier including an inductive coupling device rotatable with said exploring coil, the magnetic axes of said coil and coupling device being substantially parallel and lying in substantially the same plane parallel to the axis of rotation.

7. Apparatus for locating a concealed electrically conducting body, comprising a rotatably mounted exploring coil in which a voltage is induced by an alternating magnetic field, the axis of rotation being transverse to the coil axis, and means including a vacuum tube amplifier for indicating the induced voltage, said amplifier including an inductive coupling device rotatable with said exploring coil, the magnetic axes of said coil and coupling device being substantially parallel and lying in a substantially radial plane with respect to the axis of rotation.

8. Apparatus for locating a concealed electrically conducting body, comprising a pivotally mounted exploring coil adapted to have a voltage induced therein by an alternating magnetic field, the pivotal axis of said coil being substantially horizontal and the magnetic axis of said coil extending substantially at right angles to said pivotal axis, means for indicating the induced voltage, and a normally stationary shield enclosing said coil to reduce extraneous pick-up and comprising a metal top wall and metal side walls, the bottom of said shield being open.

THOMAS RYAN.